US010982857B2

(12) United States Patent
Doh et al.

(10) Patent No.: US 10,982,857 B2
(45) Date of Patent: Apr. 20, 2021

(54) NOZZLE FOR COMBUSTORS, COMBUSTOR, AND GAS TURBINE INCLUDING THE SAME

(71) Applicant: DOOSAN HEAVY INDUSTRIES & CONSTRUCTION CO., LTD., Changwon-si (KR)

(72) Inventors: Yunyoung Doh, Changwon-si (KR); Muhwan Chon, Changwon-si (KR); Borys Shershnyov, Changwon-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 165 days.

(21) Appl. No.: 16/226,633

(22) Filed: Dec. 20, 2018

(65) Prior Publication Data
US 2019/0264921 A1 Aug. 29, 2019

(30) Foreign Application Priority Data
Feb. 23, 2018 (KR) .................. 10-2018-0021659

(51) Int. Cl.
*F23R 3/28* (2006.01)
*F23C 7/00* (2006.01)
(Continued)

(52) U.S. Cl.
CPC .............. *F23R 3/286* (2013.01); *F23C 7/004* (2013.01); *F23R 3/14* (2013.01); *F23R 3/60* (2013.01); *F23C 2900/07001* (2013.01)

(58) Field of Classification Search
CPC .... F23R 3/286; F23R 3/60; F23R 3/04; F02C 7/22; F02C 7/222
See application file for complete search history.

(56) References Cited

U.S. PATENT DOCUMENTS 3,713,588 A * 1/1973 Sharpe .................. F23D 11/107
239/400
5,613,363 A 3/1997 Joshi et al.
(Continued)

FOREIGN PATENT DOCUMENTS

| JP | 2005-195284 A | 7/2005 |
| JP | 2012-032147 A | 2/2012 |
| KR | 10-2013-0021392 A | 3/2013 |

OTHER PUBLICATIONS

A Korean Office Action dated Apr. 24, 2019 in connection with Korean Patent Application No. 10-2018-0021659 which corresponds to the above-referenced U.S. application.

*Primary Examiner* — Todd E Manahan
*Assistant Examiner* — Thuyhang N Nguyen
(74) *Attorney, Agent, or Firm* — Invenstone Patent, LLC (57) ABSTRACT

A nozzle, a combustor, and a gas turbine are capable of uniformly pre-mixing fuel and air. The nozzle includes an integrated swirler comprising an inner tube configured to provide a first pre-mixing passage through which pre-mixed air flows, an outer tube configured to partially enclose the inner tube and form an outer fuel passage through which fuel flows, and a plurality of vanes coupled with the outer tube, each vane having an exhaust hole through which fuel exits; a fuel injector including an inner fuel passage through which fuel flows and being configured to be inserted into the inner tube of the integrated swirler; and a peg having an outer surface in which are formed a plurality of injection holes communicating with the inner fuel passage, the injection holes configured to inject the fuel of the inner fuel passage into the first pre-mixing passage.

12 Claims, 6 Drawing Sheets

(51) Int. Cl.
*F23R 3/14* (2006.01)
*F23R 3/60* (2006.01)

(56) References Cited

U.S. PATENT DOCUMENTS

| | | | |
|---|---|---|---|
| 6,915,636 B2* | 7/2005 | Stuttaford | F23L 7/002 |
| | | | 60/39.463 |
| 6,993,916 B2* | 2/2006 | Johnson | F23R 3/14 |
| | | | 239/405 |
| 8,505,304 B2* | 8/2013 | Myers | F23R 3/283 |
| | | | 60/748 |
| 2009/0056336 A1 | 3/2009 | Chila et al. | |
| 2012/0291447 A1 | 11/2012 | Boardman et al. | |
| 2013/0025284 A1 | 1/2013 | Wu et al. | |

* cited by examiner

NOZZLE FOR COMBUSTORS, COMBUSTOR, AND GAS TURBINE INCLUDING THE SAME

CROSS-REFERENCE TO RELATED APPLICATIONS

This application claims priority to Korean Patent Application No. 10-2018-0021659 filed on Feb. 23, 2018, the disclosure of which is incorporated herein by reference in its entirety.

BACKGROUND OF THE DISCLOSURE

Field of the Disclosure

Exemplary embodiments of the present disclosure relate to a nozzle for combustors, a combustor, and a gas turbine including the combustor.

Description of the Related Art

A gas turbine is a power engine configured to mix fuel with air compressed by a combustor, combust the mixture of the fuel and the compressed air, and rotate a turbine using high-temperature gas generated by the combustion. Gas turbines are used to drive a generator, an aircraft, a vessel, a train, and so forth.

Generally, gas turbines include a compressor, a combustor, and a turbine. The compressor draws in and compresses external air and then transmits the compressed air to the combustor. Air compressed by the compressor enters a high-pressure and high-temperature state. The combustor mixes fuel with compressed air supplied from the compressor and combusts the mixture. Combustion gas generated by the combustion is discharged to the turbine. Turbine blades provided in the turbine are rotated by the combustion gas, whereby power is generated. Generated power may be used in various fields, e.g., for generating electricity or driving a mechanical device.

Fuel is discharged through a nozzle installed in each combustor. Gas and fuel may be pre-mixed in the nozzle before being discharged out of the nozzle. To reduce a discharge rate of NOx, fuel and gas are required to be uniformly mixed with each other. However, fuel and air are not uniformly mixed in a contemporary combustion nozzle, reducing the stability of the combustion process.

SUMMARY OF THE DISCLOSURE

An object of the present disclosure is to provide a nozzle, a combustor, and a gas turbine capable of uniformly pre-mixing fuel and air.

Other objects and advantages of the present disclosure can be understood by the following description, and become apparent with reference to the embodiments of the present disclosure. Also, it will be clear to those skilled in the art to which the present disclosure pertains that the objects and advantages of the present disclosure can be realized by the means as claimed and combinations thereof.

In accordance with one aspect of the present disclosure, there is a provided a nozzle for a combustor. The nozzle may include an integrated swirler comprising an inner tube configured to provide a first pre-mixing passage through which pre-mixed air flows, an outer tube configured to partially enclose the inner tube and form an outer fuel passage through which fuel flows, and a plurality of vanes coupled with the outer tube, each vane having an exhaust hole through which fuel exits; a fuel injector including an inner fuel passage through which fuel flows and being configured to be inserted into the inner tube of the integrated swirler; and a peg having an outer surface in which are formed a plurality of injection holes communicating with the inner fuel passage, the injection holes configured to inject the fuel of the inner fuel passage into the first pre-mixing passage.

The integrated swirler may further include a support tube fixed to outer ends of the vanes. The nozzle may further a nozzle shroud configured to partially enclose the integrated swirler and form a second pre-mixing passage between the nozzle shroud and the integrated swirler, wherein the support tube is fitted into the nozzle shroud.

The integrated swirler may further include a plurality of fuel induction tubes that protrude rearward and are disposed at positions spaced apart from each other to form a plurality of inlet spaces, each inlet space communicating with the first pre-mixing passage.

The fuel induction tubes may each have a rear end fixed to a supporting plate in which are formed a plurality of outer fuel holes respectively communicating with the fuel induction tubes.

The fuel injector may further include an inner flange protruding outward from the fuel injector, and a support ring installed on the supporting plate and configured to support the inner flange.

The fuel injector may further include a perforated plate installed behind the peg, the perforated plate having a plurality of openings radially arranged from a center of the perforated plate. The plurality of openings may each have a cross-sectional area determined according to the arrangement such that the cross-section areas gradually increase outwardly from the center of the perforated plate.

The nozzle may further include a flow guide plate protruding from the peg toward the perforated plate. The flow guide plate may have a height that is gradually reduced toward the perforated plate.

The plurality of injection holes may include adjacent injection holes that are disposed toward an inner side of the peg and spaced apart by a first distance, and adjacent injection holes that are disposed toward an outer side of the peg and spaced apart by a second distance less than the first distance.

The plurality of injection holes may be arranged in a pattern that is inclined forward, from an inner side of the peg toward an outer side of the peg.

In accordance with another aspect of the present disclosure, there is provided a combustor including a burner having a plurality of nozzles configured to eject fuel and air, and a duct assembly coupled to one side of the burner and configured to combust the ejected fuel and air and transfer combustion gas to a turbine. Here, each nozzle may include an integrated swirler comprising an inner tube configured to provide a first pre-mixing passage through which pre-mixed air flows, an outer tube configured to partially enclose the inner tube and form an outer fuel passage through which fuel flows, a plurality of vanes coupled with the outer tube, each vane having an exhaust hole through which fuel exits; and a support tube fixed to outer ends of the vanes; and a fuel injector including an inner fuel passage through which fuel flows and being configured to be inserted into the inner tube of the integrated swirler.

In accordance with another aspect of the present disclosure, there is provided a gas turbine including a compressor configured to compress air drawn from an outside, a combustor configured to produce combustion gas by mixing fuel with the compressed air and combust the mixture, and a turbine including a plurality of turbine blades configured to be rotated by the combustion gas, the combustor comprising a burner having a plurality of nozzles configured to eject fuel and air, and a duct assembly coupled to one side of the burner and configured to combust the ejected fuel and air and transfer the combustion gas to the turbine. Here, each nozzle may include an integrated swirler comprising an inner tube configured to provide a first pre-mixing passage through which pre-mixed air flows, an outer tube configured to partially enclose the inner tube and form an outer fuel passage through which fuel flows, and a plurality of vanes coupled with the outer tube, each vane having an exhaust hole through which fuel exits; a fuel injector including an inner fuel passage through which fuel flows and being configured to be inserted into the inner tube of the integrated swirler; and a plurality of fuel induction tubes that protrude rearward and are disposed at positions spaced apart from each other to form a plurality of inlet spaces, each inlet space communicating with the first pre-mixing passage.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF THE EMBODIMENTS

Since the present disclosure may be modified in various forms, and may have various embodiments, preferred embodiments will be illustrated in the accompanying drawings and described in detail with reference to the drawings. However, this is not intended to limit the present disclosure to particular modes of practice, and it is to be appreciated that all changes, equivalents, and substitutes that do not depart from the spirit and technical scope of the present disclosure are encompassed in the present disclosure.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, preferred embodiments of the present disclosure will be described in detail with reference to the accompanying drawings. Reference now should be made to the drawings, in which the same reference numerals are used throughout the different drawings to designate the same or similar components. Details of well-known configurations and functions may be omitted to avoid unnecessarily obscuring the gist of the present disclosure. For the same reason, in the accompanying drawings, some elements are exaggerated, omitted, or depicted schematically.

Hereinafter, a gas turbine in accordance with a first embodiment of the present disclosure will be described.

Figure 1:
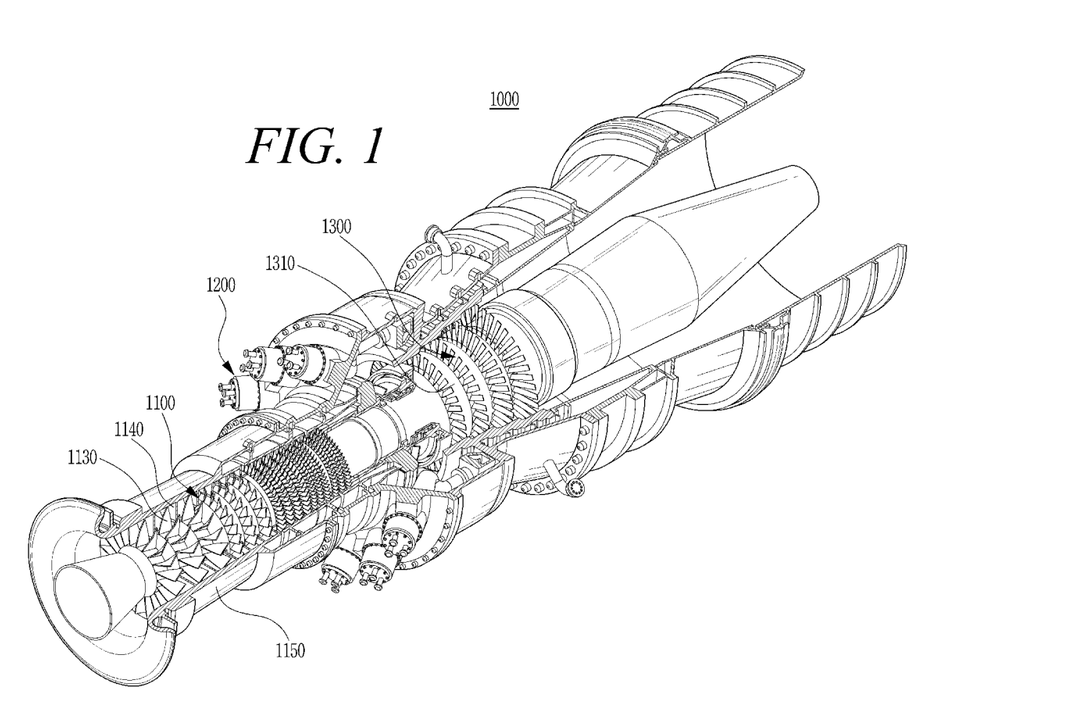
FIG. 1 is a cutaway perspective view of a gas turbine in which may be applied a combustor in accordance with a first embodiment of the present disclosure.
Figure 2:
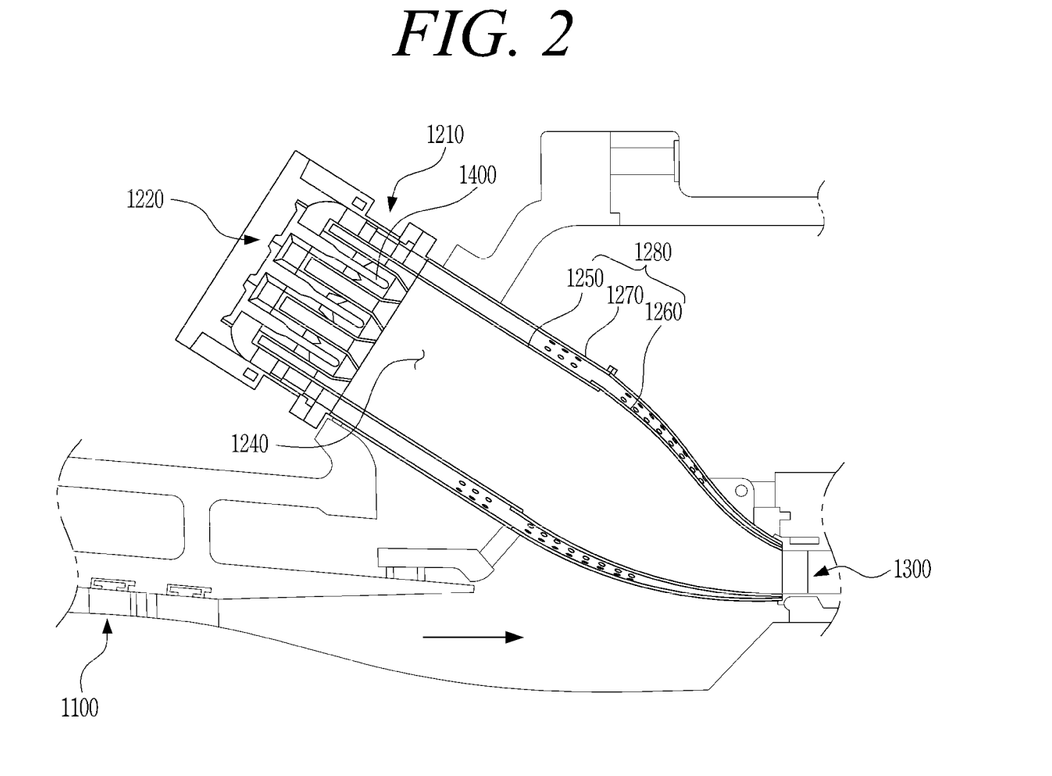
FIG. 2 is a sectional view of a combustor of FIG. 1.

FIG. 1 illustrates an internal structure of a gas turbine in accordance with an embodiment of the present disclosure, and FIG. 2 illustrates a combustor of FIG. 1.

The thermodynamic cycle of the gas turbine 1000 according to the present embodiment ideally complies with the Brayton cycle. The Brayton cycle may consist of four processes including an isentropic compression (adiabatic compression) process, an isobaric heat supply process, an isentropic expansion (adiabatic expansion) process, and an isobaric heat rejection process. In other words, the gas turbine may draw air from the atmosphere, compress the air, combust fuel under isobaric conditions to emit energy, expand this high-temperature combustion gas to convert the thermal energy of the combustion gas into kinetic energy, and thereafter discharge exhaust gas with residual energy to the atmosphere. As such, the Brayton cycle may consist of four processes including compression, heat addition, expansion, and heat rejection.

Embodying the Brayton cycle, the gas turbine 1000 may include a compressor 1100, a combustor 1200, and a turbine 1300, as shown in FIG. 1. Although the following description will be made with reference to FIG. 1, the description of the present disclosure may also be widely applied to a turbine engine having a configuration equivalent to that of the gas turbine 1000 illustrated in FIG. 1.

Referring to FIG. 1, the compressor 1100 of the gas turbine 1000 may draw air from the outside and compress the air. The compressor 1100 may supply air compressed by compressor blades 1130 to the combustor 1200 and also supply air for cooling to a high-temperature area needed to be cooled in the gas turbine 1000. Here, drawn air is compressed in the compressor 1100 through an adiabatic compression process, so that the pressure and the temperature of air passing through the compressor 1100 are increased.

The compressor 1100 is designed in the form of a centrifugal compressor or an axial compressor. Generally, the centrifugal compressor is used in a small gas turbine. On the other hand, in a large gas turbine such as the gas turbine 1000 shown in FIG. 1, a multi-stage axial compressor 1100 is generally used so as to compress a large amount of air. Here, in the multi-stage axial compressor 1100, the blades 1130 of the compressor 1100 rotate along with rotation of a rotor disk, compress drawn air, and transfer compressed air to compressor vanes 1140 disposed at a following stage. Air is compressed gradually to high pressures while passing through the blades 1130 formed in a multi-stage structure.

The compressor vanes 1140 may be mounted to an inner surface of the housing 1150 in such a way that a plurality of compressor vanes 1140 form each stage. The compressor vanes 1140 guide compressed air transferred from the compressor blades 1130 disposed at the preceding stage, toward the blades 1130 disposed at the following stage. In an embodiment, at least some of the plurality of compressor vanes 1140 may be mounted so as to be rotatable within a predetermined range, e.g., to adjust the flow rate of air.

The compressor 1100 may be operated using some of the power output from the turbine 1300. To this end, as shown in FIG. 1, a rotating shaft of the compressor 1100 may be directly coupled with a rotating shaft of the turbine 1300. In the case of the large gas turbine 1000, almost half of the output produced by the turbine 1300 may be consumed to drive the compressor 1100. Therefore, improvement in efficiency of the compressor 1100 will have a direct effect on increasing the overall efficiency of the gas turbine 1000.

The combustor 1200 may mix fuel with compressed air supplied from an outlet of the compressor 1100 and combust the mixture through an isobaric combustion process to make combustion gas having high energy. FIG. 2 illustrates an example of the combustor 1200 applied to the gas turbine 1000. The combustor 1200 may include a combustor casing 1210, a burner 1220, a nozzle 1400, and a duct assembly 1280.

The combustor casing 1210 may enclose a plurality of burners 1220 and may have an approximately cylindrical shape. The burners 1220 are disposed downstream of the compressor 1100 and may be arranged along the combustor casing 1210 in an annular pattern. A plurality of nozzles 1400 are provided in each burner 1220. Fuel ejected from the nozzles 1400 is mixed with air at an appropriate ratio to create a mixture having conditions suitable for combustion.

The gas turbine 1000 may use gas fuel, liquid fuel, or hybrid fuel formed by a combination of them. It is important to create combustion conditions suitable for reducing the amount of exhaust gas such as carbon monoxide and nitrogen oxide, which are subject to legal regulation. Recently, use of a pre-mixed combustion scheme has increased because a combustion temperature can be lowered and because uniform combustion is possible so that exhaust gas can be reduced. These advantages have fostered the increase in usage of pre-mixed combustion in spite of the difficulty to control the pre-combustion.

In the case of the pre-mixed combustion, compressed air is mixed with fuel jetted from the nozzles 1400 before the mixture enters the combustion chamber 1240. Initial ignition of pre-mixed gas is performed by an igniter (not shown), and once combustion is stabilized, fuel and air are supplied to maintain the combustion.

Referring to FIG. 2, the duct assembly 1280, which is coupled between the burner 1220 and the turbine 1300 and transmits high-temperature combustion gas, includes an outer surface along which compressed air flows toward the nozzles 1400. This process serves to cool the duct assembly 1280, which is heated by the high-temperature combustion gas being transmitted to the turbine 1300.

The duct assembly 1280 may include a liner 1250, a transition piece 1260, and a flow sleeve 1270. The duct assembly 1280 has a double-shell structure, in which the flow sleeve 1270 encloses the outer surfaces of the liner 1250 and the transition piece 1260 that are coupled to each other. Compressed air enters an annular space defined in the flow sleeve 1270 and cools the liner 1250 and the transition piece 1260.

The liner 1250 is a tube member coupled to the burners 1220 of the combustor 1200, and an internal space of the liner 1250 forms the combustion chamber 1240. One longitudinal end of the liner 1250 is coupled to the burner 1220, and the other longitudinal end of the liner 1250 is coupled to the transition piece 1260.

The transition piece 1260 is coupled to an inlet of the turbine 1300 and functions to guide high-temperature combustion gas into the turbine 1300. One longitudinal end of the transition piece 1260 is coupled with the liner 1250, and the other longitudinal end of the transition piece 1260 is coupled with the turbine 1300. The flow sleeve 1270 functions both to protect the liner 1250 and the transition piece 1260 and to prevent high-temperature heat from being directly emitted to the outside.

Figure 3:
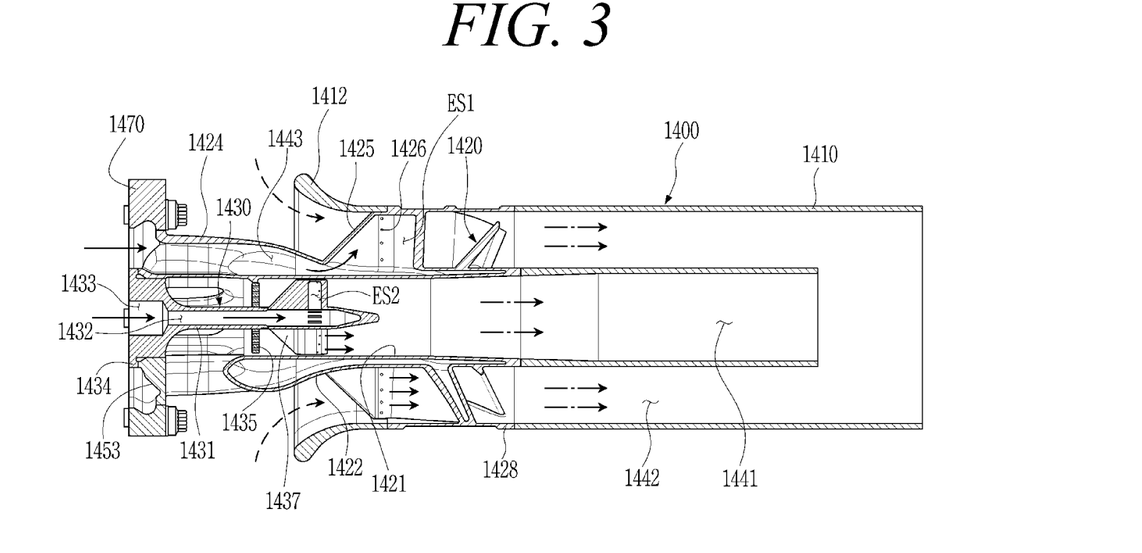
FIG. 3 is a cutaway sectional view of a nozzle in accordance with the first embodiment of the present disclosure.
Figure 4:
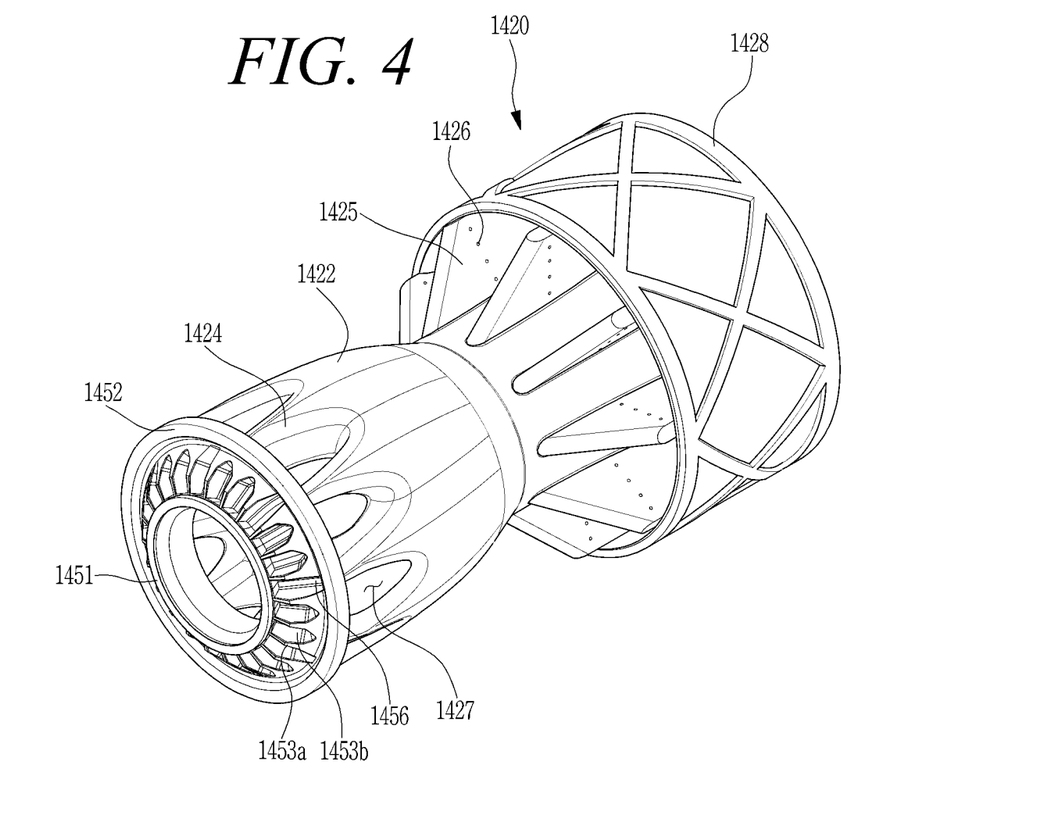
FIG. 4 is a perspective view of an integrated swirler in accordance with the first embodiment of the present disclosure.

FIG. 3 illustrates a nozzle 1400 in accordance with the first embodiment of the present disclosure, and FIG. 4 illustrates an integrated swirler of the nozzle of FIG. 3.

Referring to FIGS. 3 and 4, the nozzle 1400 includes a nozzle shroud 1410 having a tubular shape, an integrated swirler 1420 inserted into the nozzle shroud 1410, a fuel injector 1430 fitted into the integrated swirler 1420, and a nozzle flange 1470 provided to support the integrated swirler 1420. The nozzle shroud 1410 partially encloses an integrated swirler 1420.

The nozzle flange 1470 has a planar shape. A hole into which the integrated swirler 1420 is inserted is formed in the nozzle flange 1470. The nozzle flange 1470 may be fixed to a head end plate (not shown). The nozzle shroud 1410 is formed of a cylindrical tube. A horn-shaped part 1412 is formed on a rear (upstream) end of the nozzle shroud 1410 and has a diameter that gradually increases toward the intake to allow air to be easily drawn into the nozzle shroud 1410. Together with an outer tube 1422, the nozzle shroud 1410 defines a second pre-mixing passage 1442 through which air and fuel flow. That is, the second pre-mixing passage 1442 is formed between the nozzle shroud 1410 and the outer tube 1422.

The integrated swirler 1420 is fitted into the nozzle shroud 1410 and fixed to the nozzle flange 1470, and includes an inner tube 1421, the outer tube 1422, a vane 1425, a support tube 1428, a plurality of fuel induction tubes 1424, a supporting plate 1453, a support ring 1451, and an outer flange 1452.

The support ring 1451 has a substantially annular shape and is coupled with the supporting plate 1453. The supporting plate 1453 couples the support ring 1451 with the outer flange 1452 and guides fuel so that the fuel may be drawn into the fuel induction tubes 1424. A plurality of support ribs 1453*a* for coupling the support ring 1451 and the outer flange 1452 are provided on the supporting plate 1453. Grooves 1453*b* may be formed between the support ribs 1453*a*. The support ribs 1453*a* extend in a radial direction of the support plate 1453 and function to enhance the structural strength of the support plate 1453. A plurality of outer fuel holes 1456 communicating with the fuel induction tubes 1424 are formed in the supporting plate 1453.

The outer flange 1452 has an annular shape and is fixed to an outer end of the supporting plate 1453. The outer flange 1452 may be fixed to the nozzle flange 1470. The outer flange 1452, the support plate 1453, and the support ring 1451 are disposed on the rear (upstream) end of the integrated swirler 1420 and support the integrated swirler 1420 so that the integrated swirler 1420 may be stably fixed to the nozzle flange 1470. In this specification, based on the direction in which fuel flows, the rear refers an upstream side, and the front refers to a downstream side.

The inner tube 1421 may be formed of a substantially cylindrical tube having an internal space. The inner tube 1421 provides a first pre-mixing passage 1441 through which air and fuel flow. The outer tube 1422 encloses a portion of the inner tube 1421 and has an internal space. Thus, together with the inner tube 1421, the outer tube 1422 defines an outer fuel passage 1443 through which fuel flows. That is, the outer fuel passage 1443 is formed between the inner and outer tubes 1421 and 1422.

A plurality of vanes 1425 are coupled to the outer tube 1422. Each of the vanes 1425 may be formed of a curved plate to induce swirling in a fluid. The plurality of vanes 1425 may be installed on the outer tube 1422 and arranged at positions spaced apart from each other along a circumferential direction of the outer tube 1422.

Furthermore, a discharge space ES1 communicating with the outer fuel passage 1443 is formed in each vane 1425. A plurality of exhaust holes 1426 connected with the discharge space ES1 may be formed in the surface of each vane 1425. The exhaust holes 1426 may be spaced apart from each other and arranged at positions extending from the inner end of each vane 1425 to its outer end. The exhaust holes 1426 inject fuel into the second pre-mixing passage 1442. That is, fuel exiting the exhaust holes 1426 is injected into the second pre-mixing passage 1442.

The support tube 1428 is fixed to the outer ends of the vanes 1425 and may be formed of a substantially cylindrical tube. The support tube 1428 may be fitted into the nozzle shroud 1410. Therefore, the integrated swirler 1420 provided integrally with the support tube 1428 may be easily inserted into the nozzle shroud 1410.

The fuel induction tubes 1424 are coupled with the outer tube 1422 and the inner tube 1421 and protrude rearward therefrom. The fuel induction tubes 1424 communicate with the outer fuel passage 1443 to transfer fuel into the outer fuel passage 1443 and communicate with the outer fuel holes 1456 to be supplied with fuel through the outer fuel holes 1456.

The plurality of fuel induction tubes 1424 are disposed at positions spaced apart from each other so that a plurality of inlet spaces 1427 are respectively formed between the fuel induction tubes 1424. The inlet spaces 1427 communicate with the first pre-mixing passage 1441 so that air may be drawn into the first pre-mixing passage 1441 through the inlet spaces 1427.

Figure 5:
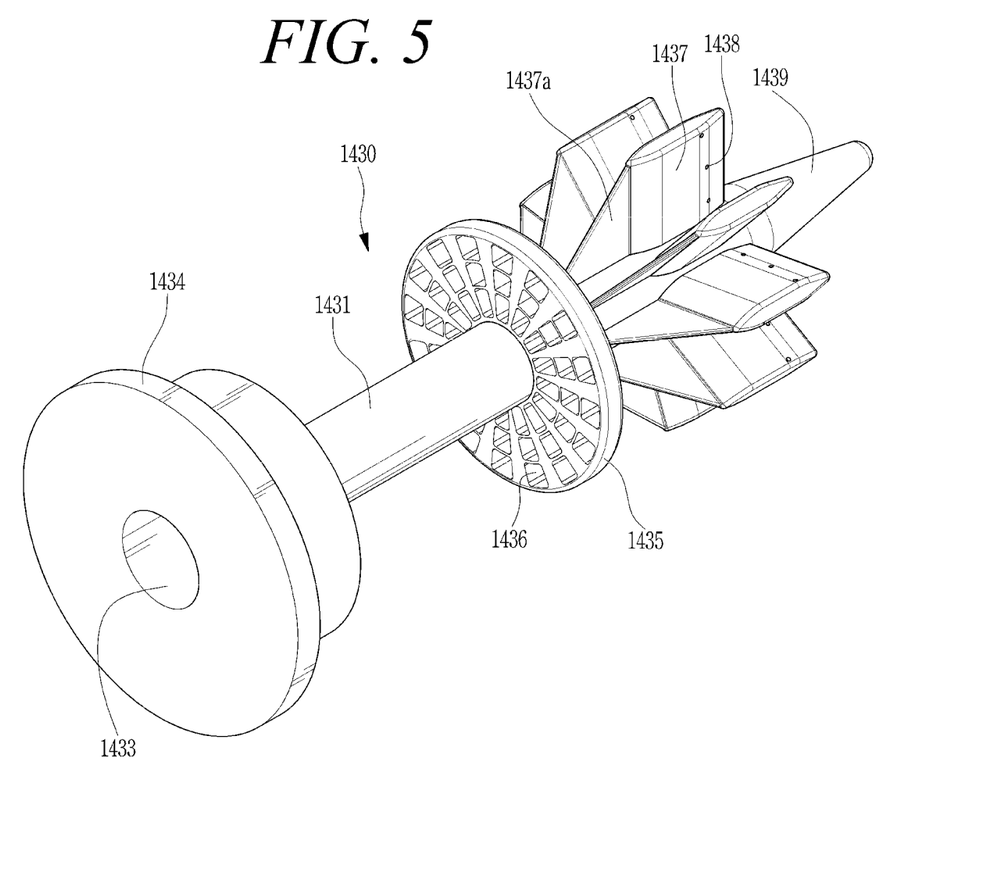
FIG. 5 is a perspective view of a fuel injector in accordance with the first embodiment of the present disclosure.

FIG. 5 illustrates a fuel injector of the nozzle of FIG. 3.

Referring to FIGS. 3 to 5, the fuel injector 1430 may include a central tube 1431, an inner flange 1434, a perforated plate 1435, a plurality of pegs 1437, and a pilot tip 1439. The fuel injector 1430 is inserted into the integrated swirler 1420 of FIG. 4 and is configured to inject fuel into the first pre-mixing passage 1441.

The central tube 1431 has a substantially tubular shape forming an inner fuel passage 1432 through which fuel flows. The pilot tip 1439 having an outer diameter gradually reducing toward its end is provided on a front end of the central tube 1431. The pilot tip 1439 functions to mitigate a flow separation phenomenon occurring on a rear end of the central tube 1431 and guide the flow of pre-mixed fuel.

The inner flange 1434 protruding outward is provided on the rear end of the central tube 1431. The inner flange 1434 may have a substantially annular shape. The inner flange 1434 is interlocked with an inner surface of the support ring 1451 and thus fixed to the integrated swirler 1420. An inner fuel hole 1433 is formed in a central portion of the inner flange 1434. The inner fuel hole 1433 communicates with the inner fuel passage 1432 so that fuel is supplied into the inner fuel passage 1432.

The plurality of pegs 1437 are radially disposed on an outer surface of the central tube 1431 and are arranged at positions spaced apart from each other in a circumferential direction of the central tube 1431. An injection space ES2 may be formed in each peg 1437. Furthermore, a plurality of injection holes 1438 communicating with the injection space ES2 are formed in an outer surface of the peg 1437. Since the injection space ES2 communicates with the inner fuel passage 1432, fuel drawn into the inner fuel passage 1432 may be injected into the first pre-mixing passage 1441 through the injection holes 1438 and mixed with air.

The perforated plate 1435 having a plurality of openings is installed on the fuel injector 1430. The perforated plate 1435 may be fixed on an outer circumferential surface of the central tube 1431. The perforated plate 1435 may have a plurality of openings 1436. For example, each opening 1436 may have a rectangular, pentagonal, triangular, or circular shape. The perforated plate 1435 is installed behind the pegs 1437 and functions to guide the flow of air such that the flow of air drawn onto the pegs 1437 is changed to a laminar flow.

The fuel injector 1430 further includes flow guide plates 1437a which protrude toward the perforated plate 1435. Each flow guide plate 1437a is formed such that its height is gradually reduced toward the perforated plate 1435. The flow guide plates 1437a protrude rearward from the respective pegs 1437, and each has a substantially triangular longitudinal cross-section. The flow guide plates 1437a function to guide air drawn onto the pegs 1437 such that the laminar flow of air can remain uniform.

As described above, in accordance with the first embodiment, the fuel injector 1430 is inserted into the integrated swirler 1420, and the pegs 1437 for injecting fuel are provided on the fuel injector 1430. Consequently, fuel and air may be uniformly pre-mixed. Furthermore, the support tube 1428 is fixed to the vanes 1425 of the integrated swirler 1420, and the supporting plate 1453 is fixed to the rear end of the integrated swirler 1420. Hence, the structural strength of the nozzle 1400 may be enhanced. Furthermore, in accordance with the first embodiment, since the fuel injector 1430 includes the perforated plate 1435 and the flow guide plate 1437a, the flow of air drawn onto the pegs 1437 may be stabilized, whereby air and fuel may be uniformly mixed.

Hereinafter, a nozzle in accordance with a second embodiment of the present disclosure will be described.

Figure 6:
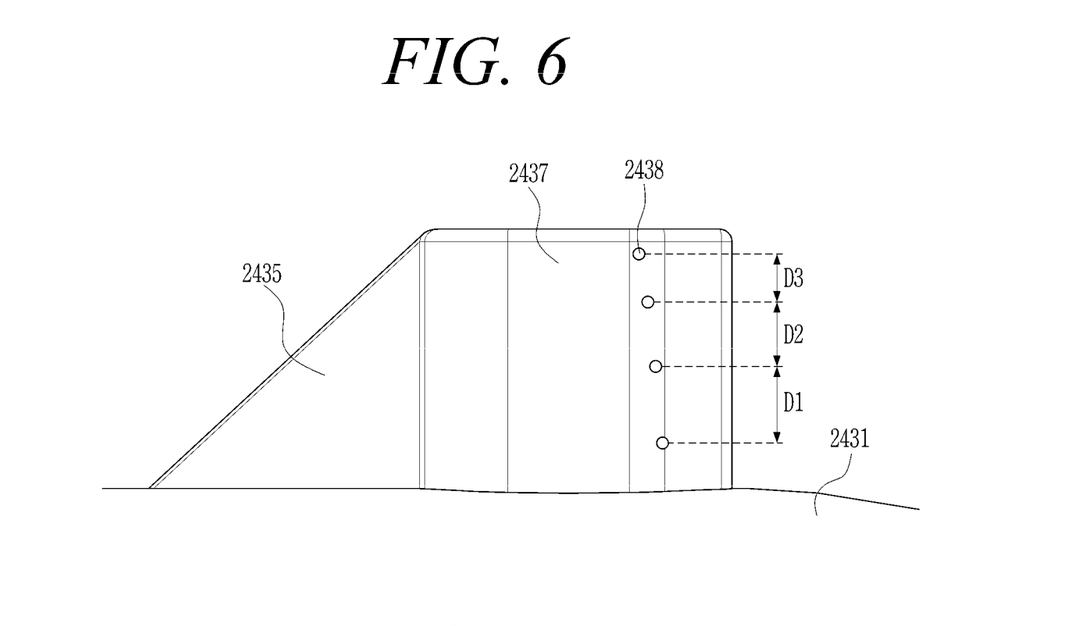
FIG. 6 is a side view of a peg of a fuel injector in accordance with a second embodiment of the present disclosure.
Figure 7:
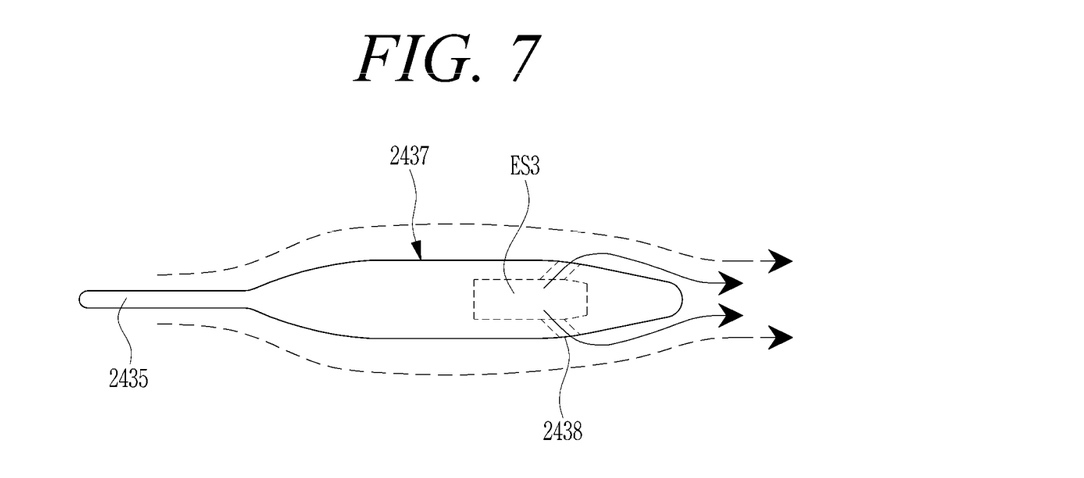
FIG. 7 is a plan view of the peg of the fuel injector in accordance with the second embodiment of the present disclosure.

FIGS. 6 and 7 illustrate a peg of a fuel injector of the nozzle in accordance with the second embodiment of the present disclosure. Here, other than the structure of a peg 2437 of a fuel injector 2430, the nozzle in accordance with the second embodiment is the same as that of the nozzle in accordance with the first embodiment. Therefore, duplicate description of the same structure will be omitted.

In this embodiment, a plurality of pegs 2437 are provided on an outer surface of the central tube 2431. The pegs 2437 may be radially disposed. The plurality of pegs 2437 are arranged at positions spaced apart from each other in a circumferential direction of the central tube 2431. An injection space ES3 communicating with the inner fuel passage may be formed in each peg 2437. Furthermore, a plurality of injection holes 2438 connected with the injection space ES3 are formed in an outer surface of the peg 2437. A flow guide plate 2435 protruding rearward from the peg 2437 is provided on the peg 2437.

The injection holes 2438 are disposed at positions spaced apart from each other in a direction from the inner end of the peg 2437 to its outer end. The injection holes 2438 may be formed such that the injection holes 2438 that are disposed near an outer side of the peg 2437 is disposed behind (farther rearward than) the injection holes 2438 that are disposed near an inner side of the peg 2437. Furthermore, the injection holes 2438 may extend from the injection space ES3 to the outer surface of the peg 2437, to be arranged in a pattern that is inclined forward, that is, from the inner side of the peg 2437 toward the outer side of the peg 2437.

As such, if the injection holes 2438 are formed to be inclined, the flow of fuel does not impede the flow of air, whereby the fuel and the air may be uniformly mixed.

The distance between adjacent injection holes 2438 that are disposed at the outer side of the peg 2437 is less than the distance between adjacent injection holes 2438 that are disposed at the inner side of the peg 2437. The injection holes 2438 that are disposed at the innermost side may be spaced apart from each other by a first distance D1. The injection holes 2438 that are disposed at the outermost side may be spaced apart from each other by a third distance D3. The injection holes 2438 that are disposed at an intermediate position may be spaced apart from each other by a second distance D2. Here, the first distance D1 may be greater than the second distance D2, and the second distance D2 may be greater than the third distance D3.

As such, in the case where the distance between the injection holes 2438 is reduced toward the outer side, a comparatively large amount of fuel may be injected into a relatively large space. Consequently, air and fuel may be uniformly mixed with each other.

Hereinafter, a nozzle in accordance with a third embodiment of the present disclosure will be described.

Figure 8:
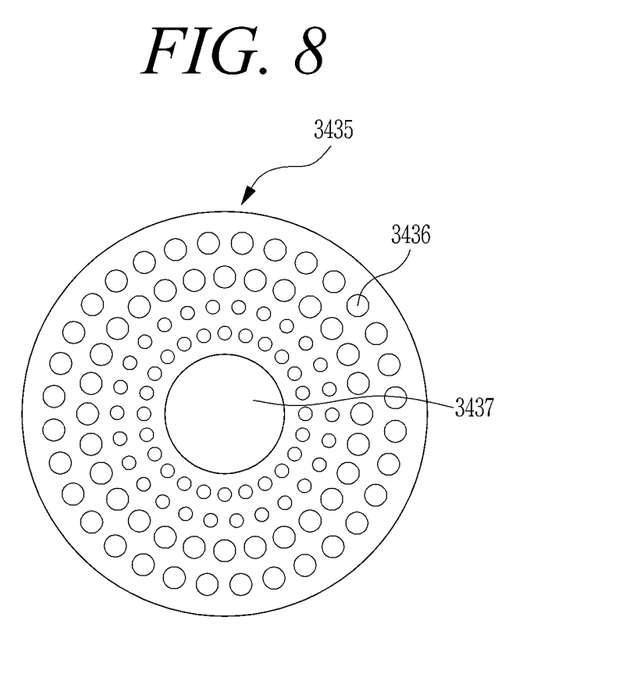
FIG. 8 is a plan view of a perforated plate of a fuel injector in accordance with a third embodiment of the present disclosure.

FIG. 8 illustrates a perforated plate of a fuel injector of the nozzle in accordance with the third embodiment of the present disclosure. Here, other than the structure of a perforated plate 3435 of a fuel injector, the nozzle in accordance with the third embodiment is the same as that of the nozzle in accordance with the first embodiment. Therefore, duplicate description of the same structure will be omitted.

The perforated plate 3435 having a plurality of openings 3436 is installed on the fuel injector. The perforated plate 3435 may be fixed on an outer circumferential surface of the central tube. Each of the openings 3436 formed in the perforated plate 3435 may have, e.g., a circular shape. However, the present disclosure is not limited to this, and the opening 3436 may have various shapes.

A hole 3437 into which the central tube is inserted is formed in a central portion of the perforated plate 3435. Each of the openings 3436 that are formed at an outer side of the perforated plate 3435 has a cross-sectional area greater than that of each of the openings 3436 that are formed at an inner side of the perforated plate 3435. The openings 3436 may be formed such that their cross-sectional areas are gradually increased from the center of the perforated plate 3435 toward the outer side. The perforated plate 3435 functions to guide the flow of air such that the flow of air drawn onto the pegs is changed to a laminar flow. Here, the flows of air at the outer side and the inner side may be precisely controlled by adjusting the sizes of the openings 3436.

As described above, according to a nozzle, a combustor, and a gas turbine in accordance with an embodiment of the present disclosure, an integrated swirler and a fuel injector are employed, whereby air and fuel may be uniformly pre-mixed.

While the present disclosure has been described with respect to the specific embodiments, it will be apparent to those skilled in the art that various changes and modifications may be made without departing from the scope of the disclosure as defined in the following claims.

What is claimed is:

1. A nozzle for a combustor, comprising:
   an integrated swirler comprising:
      an inner tube configured to provide a first pre-mixing passage that is annular and through which pre-mixed air flows,
      an outer tube configured to partially enclose the inner tube and form an outer fuel passage through which fuel flows, and
      a plurality of vanes coupled with the outer tube, each vane having an exhaust hole through which fuel exits; a fuel injector including an inner fuel passage through which fuel flows and being configured to be inserted into the inner tube of the integrated swirler;
   a peg having an outer surface in which are formed a plurality of injection holes communicating with the inner fuel passage, the plurality of injection holes configured to inject the fuel of the inner fuel passage into the first pre-mixing passage; and
   a plurality of fuel induction tubes arranged around the fuel injector, each of the plurality of fuel induction tubes being coupled with the inner tube and the outer tube and protruding rearward from the inner tube and the outer tube,
   wherein the plurality of fuel induction tubes are spaced apart from each other in a circumferential direction of the inner tube to form an inlet space between each adjacent pair of the plurality of fuel induction tubes, each said inlet space communicating with the first pre-mixing passage.

2. The nozzle according to claim 1, wherein the integrated swirler further comprises a support tube fixed to outer ends of the plurality of vanes.

3. The nozzle according to claim 2, further comprising a nozzle shroud configured to partially enclose the integrated swirler and form a second pre-mixing passage between the nozzle shroud and the integrated swirler, wherein the support tube is fitted into the nozzle shroud.

4. The nozzle according to claim 1, wherein each of the plurality of fuel induction tubes has an equal size and is disposed an equal distance from the fuel injector.

5. The nozzle according to claim 1, wherein each of the plurality of fuel induction tubes has a rear end fixed to a supporting plate in which are formed a plurality of outer fuel holes respectively communicating with the plurality of fuel induction tubes.

6. The nozzle according to claim 5, wherein the fuel injector further includes a perforated plate installed behind the peg, the perforated plate having a plurality of openings radially arranged from a center of the perforated plate.

7. The nozzle according to claim 6, wherein the plurality of openings each have a cross-sectional area determined according to an arrangement such that the cross-section areas gradually increase outwardly from the center of the perforated plate.

8. The nozzle according to claim 6, further comprising a flow guide plate protruding from the peg toward the perforated plate.

9. The nozzle according to claim 1, wherein the plurality of injection holes include adjacent injection holes that are disposed toward an inner side of the peg and spaced apart by a first distance, and adjacent injection holes that are disposed toward an outer side of the peg and spaced apart by a second distance less than the first distance.

10. The nozzle according to claim 1, wherein the plurality of injection holes are arranged in a pattern that is inclined forward, from an inner side of the peg toward an outer side of the peg.

11. A nozzle for a combustor, comprising:
an integrated swirler comprising:
  an inner tube configured to provide a first pre-mixing passage through which pre-mixed air flows,
  an outer tube configured to partially enclose the inner tube and form an outer fuel passage through which fuel flows,
  a plurality of vanes coupled with the outer tube, each vane having an exhaust hole through which fuel exits, and
  a plurality of fuel induction tubes protruding rearward from the inner tube and the outer tube, each of the plurality of fuel induction tubes having a rear end fixed to a supporting plate in which are formed a plurality of outer fuel holes respectively communicating with the plurality of fuel induction tubes;
a fuel injector including an inner fuel passage through which fuel flows and being configured to be inserted into the inner tube of the integrated swirler; and
a peg having an outer surface in which are formed a plurality of injection holes communicating with the inner fuel passage, the plurality of injection holes configured to inject the fuel of the inner fuel passage into the first pre-mixing passage,
wherein the fuel injector further includes:
  an inner flange protruding outward from the fuel injector, and
  a support ring installed on the supporting plate and configured to support the inner flange.

12. A nozzle for a combustor, comprising:
an integrated swirler comprising:
  an inner tube configured to provide a first pre-mixing passage through which pre-mixed air flows,
  an outer tube configured to partially enclose the inner tube and form an outer fuel passage through which fuel flows, and
  a plurality of vanes coupled with the outer tube, each vane having an exhaust hole through which fuel exits;
a fuel injector including an inner fuel passage through which fuel flows and being configured to be inserted into the inner tube of the integrated swirler; and
a peg having an outer surface in which are formed a plurality of injection holes communicating with the inner fuel passage, the plurality of injection holes configured to inject the fuel of the inner fuel passage into the first pre-mixing passage,
wherein the fuel injector further includes a perforated plate that is installed behind the peg and has a plurality of openings radially arranged from a center of the perforated plate,
wherein the nozzle further comprises a flow guide plate protruding from the peg toward the perforated plate, and
wherein the flow guide plate has a height that is gradually reduced toward the perforated plate.

* * * * *